(12) United States Patent
Heckroth et al.

(10) Patent No.: US 11,530,149 B2
(45) Date of Patent: Dec. 20, 2022

(54) RECYCLING OF ALKALI SULFATE RICH WASTE WATER BY BIOLOGICAL PRE-TREATMENT WITH AN EXTREME HALOPHILIC ORGANISM

(71) Applicant: COVESTRO INTELLECTUAL PROPERTY GMBH & CO. KG, Leverkusen (DE)

(72) Inventors: Heike Heckroth, Odenthal (DE); Rainer Weber, Odenthal (DE); Christoph Herwig, Vienna (AT); Nicole Mahler, Vienna (AT)

(73) Assignee: Covestro Intellectual Property GMBH & Co. KG, Leverkusen (DE)

( * ) Notice: Subject to any disclaimer, the term of this patent is extended or adjusted under 35 U.S.C. 154(b) by 0 days.

(21) Appl. No.: 16/979,239

(22) PCT Filed: Mar. 5, 2019

(86) PCT No.: PCT/EP2019/055379
§ 371 (c)(1),
(2) Date: Sep. 9, 2020

(87) PCT Pub. No.: WO2019/170632
PCT Pub. Date: Sep. 12, 2019

(65) Prior Publication Data
US 2021/0053855 A1 Feb. 25, 2021

(30) Foreign Application Priority Data
Mar. 9, 2018 (EP) ..................................... 18160929

(51) Int. Cl.
*C02F 3/34* (2006.01)
*C02F 1/461* (2006.01)
(Continued)

(52) U.S. Cl.
CPC ................. *C02F 3/34* (2013.01); *C02F 1/461* (2013.01); *C02F 2101/101* (2013.01); *C02F 2101/34* (2013.01); *C02F 2101/345* (2013.01)

(58) Field of Classification Search
None
See application file for complete search history.

(56) References Cited

U.S. PATENT DOCUMENTS 2,778,205 A * 1/1957 Berger .................. C10G 33/06
62/532
5,346,620 A 9/1994 Hendrix et al.
(Continued)

FOREIGN PATENT DOCUMENTS

EP 2631219 A1 * 8/2013 ................ C02F 3/34

OTHER PUBLICATIONS

Erdoğmuş, S.F., Mutlu, B., Korcan, S.E. et al. Aromatic Hydrocarbon Degradation by Halophilic Archaea Isolated from Çamaltı Saltern, Turkey. Water Air Soil Pollut 224, 1449 (2013). https://doi.org/10.1007/s11270-013-1449-9 (Year: 2013).*
(Continued)

*Primary Examiner* — Chester T Barry
(74) *Attorney, Agent, or Firm* — K&L Gates LLP (57) ABSTRACT

The present invention relates to an aqueous composition comprising cells of at least one strain of a halophilic microorganism, and alkali sulfate in a concentration of at least 30 g/l based on the total volume of the aqueous composition. The present invention further relates to a method for treating a waste water, comprising obtaining or providing a waste water, contacting said waste water with cells of at least one strain of a halophilic microorganism, and thereby generating an aqueous composition comprising alkali sulfate in a concentration of at least 30 g/l, and
(Continued)

incubating said aqueous composition under conditions which allow for the treatment of the waste water.

15 Claims, 5 Drawing Sheets

(51) Int. Cl.
*C02F 101/10* (2006.01)
*C02F 101/34* (2006.01)

(56) References Cited

U.S. PATENT DOCUMENTS 5,730,882 A * 3/1998 Gallup ............... B01D 17/0208
210/708
2010/0219372 A1* 9/2010 Hook ...................... C01D 3/16
252/182.32

OTHER PUBLICATIONS

Kissin, "Catagenesis of light aromatic compounds in petroleum," Organic Geochemistry, vol. 29, Issue 4, 1998, pp. 947-962, ISSN 0146-6380, https://doi.org/10.1016/S0146-6380(98)00144-2 (Year: 1998).*

International Search Report for PCT/EP2019/055379 dated Apr. 3, 2019.

Written Opinion of the International Searching Authority for PCT/EP2019/055379 dated Apr. 3, 2019.

International Preliminary Report on Patentability received for PCT Patent Application No. PCT/EP2019/055379, dated Sep. 24, 2020, 8 pages.

Mari C Y R L Bonf et al: "Biodegradation of aromatic hydrocarbons by Haloarchaea and their use for the reduction of the chemical oxygen demand of hypersaline petroleum produced water", Chemosphere, Pergamon Press, Oxford, GB, vol. 84, No. 11, May 4, 2011 (May 4, 2011), pp. 1671-1676.

Karbalaei-Heidari, et al., "Production, optimization and purification of a novel extracellular protease from the moderately halophilic bacterium Halobacillus karajensis," Journal of Industrial Microbiology and Biotechnology, vol. 36, No. 1, Jan. 1, 2009, pp. 21-27.

* cited by examiner

RECYCLING OF ALKALI SULFATE RICH WASTE WATER BY BIOLOGICAL PRE-TREATMENT WITH AN EXTREME HALOPHILIC ORGANISM

CROSS-REFERENCE TO RELATED APPLICATIONS

This application is a national stage application (under 35 U.S.C. § 371) of PCT/EP2019/055379, filed Mar. 5, 2019, which claims benefit of European Application No. 18160929.8, filed Mar. 9, 2018, both of which are incorporated herein by reference in their entirety.

FIELD OF THE INVENTION

The present invention relates to an aqueous composition comprising cells of at least one strain of a halophilic microorganism, and alkali sulfate in a concentration of at least 30 g/l based on the total volume of the aqueous composition. The present invention further relates to a method for treating a waste water comprising alkali sulfate, comprising obtaining or providing a waste water comprising alkali sulfate, contacting said waste water with cells of at least one strain of a halophilic microorganism, and thereby generating an aqueous composition comprising alkali sulfate in a concentration of at least 30 g/l, and incubating said aqueous composition under conditions which allow for the treatment of the waste water.

BACKGROUND OF THE INVENTION

Solutions of sodium sulfate are produced in numerous reactions of sodium compounds with sulfuric acid or with sulfur dioxide and oxygen. These solutions as well as solutions of other alkali sulfates (such as potassium or lithium sulfate) must be treated to prevent water pollution.

The treatment of sulfate rich waste waters includes physico-chemical methods (such as extraction or precipitation of sulfate) or biological treatment (such as use of sulfate reducing bacteria). However, these methods are sophisticated, partially require intense dilution and use high amounts of energy and/or chemicals. Goal of the conventional treatment is the conversion of sulfate to less ecologically harmful components and the release into the environment.

For the conventional biological treatment sulfate is degraded by sulfate reducing bacteria to form sulfide. Organic impurities in the waste water are degraded with conventional methane producing bacteria. However, such method produce sulfide which was shown to distinctly inhibit the activity of conventional organisms and to lead to an unsatisfactory COD (chemical oxygen demand) removal performance. Therefore, further purification steps such as stripping might be required in order to reduce the sulfide content (Yamaguchi et al., 1999).

So far, the conventional biological treatment only allows for the treatment of waste waters with concentrations of up to 5 g sodium sulfate per liter (see Vallero et al., 2005, Yamaguchi et al. 1999, or Saritpongteeraka, et al. 2008). Higher concentrations of sodium sulfate in the waste water, in principle, inhibit biological activity. In order to allow for a biological treatment of sulfate-rich waste waters, the content of sulfate is currently reduced by physico-chemical pretreatment steps.

For example, U.S. Pat. No. 5,346,620 discloses a method for the treatment of sodium sulfate rich (>20% (w/v)) waste water by extraction of sulfate using organic solvent. After removing sodium sulfate, the waste water is treated biologically by activated sludge for removal of TOC (Total organic carbon) and reduction of organic nitrogen.

In contrast to the above mentioned US patent concept of this invention is the biological treatment of sulfate rich waste water (>30 g/L) without prior treatment. As high sulfate concentration results in high osmotic pressure microorganisms are used that are known for thriving in hyperosmotic environments: halophilic microorganisms. Experiments investigating halophilic microorganisms are generally performed on high concentrations of NaCl. Basic idea of this invention is to let the organisms thrive in high sodium sulfate concentrations instead of high NaCl concentration. Reaction of halophilic cells to changes of cation or anion in the medium has rarely been researched. One exception was presented by Amoozegar et al., who cultivated the moderately halophilic bacterium *Salinivibrio* sp. on medium, where NaCl was replaced by KCl or by $NaNO_3$ (Amoozegar et al., 2008). While growth was inhibited for KCl, cells showed high cell densities for $NaNO_3$. However, Lipase production was highly repressed for $NaNO_3$, indicating that exchanges of anion/cation can have unpredictable consequences for enzyme production. Mechanisms and interactions of osmolytes in extreme halophiles are not well understood yet.

Growth of halophilic microorganisms on sulfate-rich medium is rarely reported in literature. Amoozegar et al. describe the moderate *Halobacillus* sp. strain MA-2 to grow in medium containing up to 15% (w/v) sodium sulfate (Amoozegar et al., 2003). The *Halobacillus* showed significant growth in all samples and increased production of amylase when grown in high concentrations of sodium sulfate. However, a later publication from the same group showed that growth of *Halobacillus* MA-2 was inhibited distinctly when sodium chloride was replaced by sodium sulfate (Karbalaei-Heidari et al., 2009). Formation of active product decreased to 0 units/mL with 2 M sodium sulfate. The example shows that reaction of microorganisms to high sulfate concentrations is difficult to predict and metabolic activity of halophilic microorganisms at high sulfate concentrations is unapparent.

Membrane electrolysis processes are commonly used for the electrolysis of solutions containing sodium chloride, but could be also used for cleavage of $Na_2SO_4$ to sulfuric acid and NaOH. Thus, waste water could be, in principle, treated by sodium sulfate electrolysis However, membrane electrolysis is only possible when TOC (total organic carbon) of the solution is below a certain threshold. Higher concentrations of organic components act as confounding factors in the membrane electrolysis cell.

Advantageously, it has been found in the studies underlying the present invention that the total organic carbon content of solutions with a high concentration of sodium sulfate can be reduced by halophilic microorganism. Therefore, the halophilic microorganisms are a valuable tool for the treatment of waste waters having a high concentration of sodium sulfate. Further, halophilic microorganisms may be also a tool treatment of waste waters having a high concentration of other alkali sulfates such as lithium or potassium sulfate. After treatment of the waste water by the halophilic microorganism, i.e. after reducing the TOC content, the treated waste water could be further subjected to electrophoresis. In case of sodium sulfate rich waste wasters, the sodium sulfate content of the waste water is reduced, and NaOH, sulfuric acid, oxygen and hydrogen are produced.

Based on the findings of the present invention, it is possible to recycle waste water streams having high alkali sulfate content. In the first step, alkali sulfate-rich waste water, e.g. sodium sulfate-rich waste water, is treated biologically for degradation of organic contamination. As a result the total organic carbon (TOC) is reduced. In the second step of the process the alkali sulfate, e.g. the Na2SO4 in the waste water is cleaved electrochemically, e.g. to sulfuric acid and sodium hydroxide in case of sodium sulfate-rich waste waters. Without the prior biologic treatment, organic components from the industrial waste water would cause membrane fouling very quickly. As a result power consumption would increase distinctly and migration of sodium ions would be impeded. A high frequent purging of the system would be necessary. With the presented two-step process an efficient recycling of sulfate rich waste water can be advantageously achieved.

Main advantage of this treatment is that chemical components are returned to the resource cycle instead of getting disposed. In case of sodium sulfate rich waste wasters, the chemicals NaOH, sulfuric acid, hydrogen and oxygen are produced from waste streams. The waste-to-value approach would be, if applied, beneficial in terms of economic and ecologic factors compared to established disposal methods. The invention helps achieving an inexpensive, quick and efficient recycling process for sulfate rich waste water. Extremophilic features of the organism that is used do not require sterile processing. This is an advantage in terms of costs and manageability of the process.

BRIEF SUMMARY OF THE PRESENT INVENTION

The present invention relates to an aqueous composition comprising
  (a) cells of at least one strain of a halophilic microorganism, and
  (b) alkali sulfate
wherein the concentration of alkali sulfate in the aqueous composition is least 30 g/l based on the total volume of the aqueous composition In an embodiment of the present invention, the alkali sulfate is sodium sulfate ($Na_2SO_4$). In another embodiment of the present invention, the alkali sulfate is lithium sulfate ($Li_2SO_4$). In a further embodiment of the present invention, the alkali sulfate is potassium sulfate ($K_2SO_4$).

In an embodiment of the present invention, wherein the concentration of alkali sulfate such as sodium sulfate in the aqueous composition is least 50 g/l, in particular wherein the concentration of alkali sulfate in the aqueous composition is 100 g/l to 150 g/l based on the total volume of the aqueous composition.

In an embodiment of the present invention, the halophilic microorganism is a halophilic archaeon. In particular, the halophilic archaeon is an achaeon belonging to the family of the Halobacteriaceae.

In a particularly preferred embodiment of the composition of the present invention, the halophilic archaeon is selected from the group consisting of *Haloferax mediterranei*, *Haloferax* sp. D1227, *Haloferax volcanii*, *Haloferax alexandrines*, *Haloferax chudinovii*, *Haloferax denitrificans*, *Haloferax elongans*, *Haloferax gibbonsii*, *Haloferax larsenii*, *Haloferax lucentense*, *Haloferax mediterranei*, *Haloferax mucosum*, *Haloferax prahovense* and *Haloferax sulfurifontis*.

In another preferred embodiment, the halophilic archaeon is *Natronobacterium gregoryi*.

In another preferred embodiment of the composition of the present invention, the halophilic microorganism is a halophilic bacterium, in particular the halophilic bacterium is a bacterium belonging to the genus *Halomonas*, preferably *Halomonas organivorans*, *Halomonas* sp. MA-C, *Halomonas alimentaria*, *Halomonas halophila*, *Halomonas maura*, *Halomonas salina*, *Halomonas eurihalina*.

In an embodiment of the present invention, the aqueous composition further comprises at least one compound which allows for the growth of the halophilic microorganism, in particular glycerol, acetate, glucose, sucrose, lactate, malate, succinate, or citrate.

In an embodiment of the present invention, the aqueous composition further comprises at least one organic contaminant such formate, phenol, or aniline.

In an embodiment of the aqueous composition of the present invention, the aqueous composition has a TOC content of at least 50 mg/l.

In an embodiment of the aqueous composition of the present invention, the halophilic microorganism is growing in the aqueous composition.

The present invention also relates to a bioreactor comprising the aqueous composition of the present invention.

The present invention further pertains to method for treating a waste water, comprising
  (a) obtaining or providing a waste water comprising alkali sulfate,
  (b) contacting said waste water with cells of at least one strain of a halophilic microorganism, and thereby generating an aqueous composition according to the present invention, and
  (c) incubating said aqueous composition under conditions which allow for the treatment of the waste water.

In a preferred embodiment of the method of the present invention, the aqueous composition generated in step b) comprises at least one organic contaminant.

In a preferred embodiment of the method of the present invention, the treatment of the waste water comprises the reduction of the total organic content of said waste water and/or the reduction of the amount of at least one organic contaminant comprised by said waste water.

In a preferred embodiment of the method of the present invention, the method further comprises the steps of separating the cells from the treated waste water to obtain a filtrate of treated waste water and subjecting the obtained filtrate of treated waste water to alkali sulfate electrolysis, in particular sodium sulfate electrolysis.

Finally, the present invention relates to the use of cells of at least one strain of a halophilic microorganism for reducing the total organic carbon content of said waste water and/or the amount of at least one organic contaminant in the aqueous composition according the present invention.

DETAILED SUMMARY OF THE PRESENT INVENTION

As set forth above, the present invention relates to an aqueous composition comprising
  (a) cells of at least one strain of a halophilic microorganism, and
  (b) alkali sulfate (such as sodium sulfate ($Na_2SO_4$))
wherein the concentration of alkali sulfate in the aqueous composition is least 30 g/l.

The alkali sulfate is preferably sodium sulfate ($Na_2SO_4$), lithium sulfate ($Li_2SO_4$), or potassium sulfate ($K_2SO_4$).

The aqueous composition according to the present comprises cells of at least one strain of a halophilic microorganism.

In a preferred embodiment of the present invention, the halophilic microorganism a halophilic archaeon (archaebacterium). Preferably, the halophilic archaeon is a halophilic archaeon belonging to the class of Halobacteria. More preferably, the halophilic archaeon is an archaeon belonging to the order of Halobacteriales. Even more preferably, the halophilic archaeon is an archaeon belonging to the family Halobacteriaceae. Most preferably, the halophilic archaeon is an archaeon belonging to the genus *Haloferax*.

Several species belonging to the genus *Haloferax* have been described in the literature, for example *Halobacterium salinarum*, *Haloferax volcanii*, *Haloferax alexandrines*, *Haloferax* chudinovii, *Haloferax denitrificans*, *Haloferax elongans*, *Haloferax gibbonsii*, *Haloferax larsenii*, *Haloferax* lucentense, *Haloferax mediterranei*, *Haloferax mucosum*, *Haloferax prahovense* and *Haloferax sulfurifontis*. Thus, it is envisaged that the cells of the aqueous composition of the present invention belong to any one of these species.

In particular, the halophilic archaeon is *Haloferax mediterranei* (abbreviated "HFX" herein). The species has been described by Rodriguez-Valera, F., Juez, G., Kushner, D. J. (1983). *Halobacterium mediterranei* sp. nov., a new carbohydrate-utilizing extreme halophile. *Syst. Appl. Microbiol.* 4: 369-381. The document is herewith incorporated by reference in its entirety. Further, the strain has been deposited in the DSM (Deutsche Sammlung von Mikroorganismen und Zellkulturen, Braunschweig, Germany) under DSM number 1411. How to culture this strain is well-known in the art. For example, suitable culture conditions can be e.g. assessed from the DSMZ database for this strain.

In another preferred embodiment, the halophilic archaeon is an archaeon belonging to the genus *Natronomonas*. *Natronomonas* is a genus of the Halobacteriaceae. Preferably, the archaeon belonging to the genus *Natronomonas* is *N. moolapensis*. more preferably, the archaeon belonging to the genus *Natronomonas* is *N. pharaonic* (Kamekura M, et al. (1997). Int. J. Syst. Bacteriol. 47 (3): 853-857).

In another preferred embodiment, the halophilic archaeon is *Natronobacterium gregoryi*. The strain has been deposited in the DSM (Deutsche Sammlung von Mikroorganismen und Zellkulturen, Braunschweig, Germany) under DSM number 3393.

In another preferred embodiment, the halophilic microorganism is a halophilic bacterium. Preferably, the halophilic bacterium is a halophilic bacterium belonging to the class of Gammaproteobacteria. More preferably, the halophilic bacterium is a bacterium belonging to the order of Oceanospirillales. Even more preferably, the halophilic bacterium is a bacterium belonging to the family Halomonadaceae. Most preferably, the halophilic bacterium is a bacterium belonging to the genus *Halomonas*. Preferred *Halomonas* strains as well as preferred media for the growth of the strains are e.g. disclosed in Mata, J. A., Martínez-Cánovas, J., Quesada, E., Béjar, V., 2002. A Detailed Phenotypic Characterisation of the Type Strains of *Halomonas* Species. Systematic and Applied Microbiology 25, 360-375 which herewith is incorporated by reference with respect to its entire disclosure content. Preferably, the halophilic bacterium is *Halomonas organivorans*, *Halomonas* sp. MA-C, *Halomonas alimentaria*, *Halomonas halophila*, *Halomonas maura*, *Halomonas salina*, *Halomonas eurihalina*.

The most preferred *Halomonas* strains are *Halomonas organivorans* and *Halomonas* sp. MA-C. Both strains are described in the scientific literature. The strain MA-C was e.g. described by Azachi et al. (Can. J. Microbiol., vol. 41 (1995): 548-553) and Oren et al. (Biodegradation (1992), 3: 387-398) both of which are herewith incorporated by reference in their entirety. The strain MA-C has been deposited in the DSM (Deutsche Sammlung von Mikroorganismen und Zellkulturen, Braunschweig, Germany) as DSM 7328.

Preferably, the halophlic microorganism is not *Halobacillus* sp. strain MA-2. Accordingly, the composition of the present invention does not comprise cells *Halobacillus* sp. strain MA-2.

The aqueous composition of the present invention is, preferably, a suspension of the cells of the halophilic microorganism in an aqueous solution. The aqueous solution preferably is mainly comprised of waste water. As described elsewhere herein, the waste water preferably organic compounds. In embodiment, the waste water results from chemical or biological production processes. Preferably, the aqueous solution has a concentration of alkali sulfate as described herein elsewhere.

The composition of the present invention can be thus obtained by contacting (e.g. by mixing) cells of at least one strain of a halophilic microorganism with a waste water comprising alkali sulfate in a concentration as specified above (e.g. in a concentration of at least 30 g/l). Moreover, substrates, nutrients and trace elements which allow for the growth of the cells may be added to the composition. Further, the waste water may be processed to a to a certain pH as described herein elsewhere (preferably before contacting the waste water with the cells).

Waste waters comprising alkali sulfate are well known in the art and may e.g. results from chemical or biological production processes. E.g., waste waters comprising sodium sulfate are described in ULLMANN'S Encyclopedia of Industrial Chemistry, 2012, Vol. 33, Wiley-VCH Verlag GmbH & Co. KGaA, Weinheim, DOI: 10.1002/14356007.a24_355, see in particular Table 4 on page 389. Preferably the waste water is selected from waste water from viscose-fiber spinning baths, waste water from sodium dichromate production, waste water from ascorbic acid production, waste water from production of boric acid, waste water from production of chlorine dioxide, waste water from production of hydroxylamine, waste water from production of lithium carbonate, waste water from neutralization of sulfuric acid waste, waste water from roasting and chlorination of pyrite cinder, and waste water from Desulfurization of flue gases.

The concentration of the biomass of the cells of the halophilic microorganism in the composition of the present invention is, preferably, at least 0.1 g/l, more preferably, at least 1 g/and most preferably at least 2 g/l. The term "biomass" as used herein means dry biomass. Thus, the term refers to dry mass of the cells of the halophilic microorganism. In an embodiment, the composition comprises between about $10^6$ and about $10^{12}$ colony forming units of the halophilic microorganism. The cells comprised by the composition of the present invention shall be viable, i.e. living cells. How to assess whether cells are viable, or not, can be assessed by well-known methods.

In a preferred embodiment of the aqueous composition of the present invention, the halophilic microorganism grows in the aqueous composition. Thus, the halophilic microorganism shall not only be viable, it shall also grow. The growth of the halophilic microorganism allows for the reduction of the TOC content and/or for the reduction of the content of the organic contaminant (such as phenol, formate and/or aniline) comprised by the composition (as described elsewhere herein). Preferably, the halophilic microorganism grows at a growth rate p of at least 0.005 h. Accordingly, the doubling time of the cells in the composition is 139 hours or less than 139 hours, e.g. within a range of 5 to 139 hours. Also preferably, the growth rate p is within a range of 0.005-0.3 h, in particular within in range of 0.008-0.02 h. Accordingly, the doubling time of the cells in the composition of the present invention is preferably within a range of 2.3 to 139 hours, in particular within a range of 32.5 to 87 hours.

The composition of the present invention preferably comprises alkali sulfate such as sodium sulfate in a concentration of at least 30 g/l, more preferably in a concentration of 50 g/l and most preferably in a concentration of 100 g/l. In the studies underlying the present invention, sodium sulfate concentrations between 50 and 400 g/l were tested (see Examples section). Growth of the tested microorganism was observed for concentrations between 50 and 250 g/l. The best results were obtained for a concentration of sodium sulfate of 100 to 150 g/l. Accordingly, the concentration of sodium sulfate in the composition is preferably between 50 and 250 g/l, and more preferably between 100 and 150 g/l. The concentrations given herein are preferably based on the total volume of the aqueous composition of the present invention.

According to the art, the halophilic microorganisms require high concentrations of NaCl for growth. For example, the strain tested in the Examples, *Haloferax mediterranei*, has been described to require a concentration of at least 60 g/l NaCl for growth. Advantageously, it has been shown in the context of the studies underlying the present invention that *Haloferax mediterranei* is capable of growing in the aqueous composition as defined herein even in the complete absence of NaCl in the composition.

In an embodiment of the present invention, the composition thus does not comprise NaCl, or comprises NaCl in a concentration well below the NaCl concentration usually required for growth. Preferably, the composition additionally comprises less than 50 g/l sodium chloride, more preferably less than 25 g/l sodium chloride, even more preferably less than 10 g/l of sodium chloride.

Also, it has been shown that that the tested strain can grow, if the composition comprises both sodium chloride and alkali sulfate. Accordingly, sodium chloride may be present in the composition in addition to the alkali sulfate, in particular in addition to the sodium sulfate.

In another embodiment of the present invention, the composition may further comprise NaCl, i.e. may comprise NaCl in addition to the alkali sulfate (such as sodium sulfate). Preferably, the composition additionally comprises at least 50 g/l NaCl, in particular at least 100 g/l NaCl.

The pH of the composition of the aqueous composition shall be adjusted for maintaining the viability of the cells of the at least one halophilic microorganism. In particular, the pH of the composition shall allow for growth of the halophilic microorganism and/or for the reduction of the TOC content or the organic contaminant as described elsewhere herein. Preferably, the pH value of the composition of the present invention is in the range from 4 to 9, more preferably in the range of 6.0 to 8.2, even more preferably in the range of 6.2 to 7.6, most preferably in the range of 6.8 to 7.4. The optimal pH value is 7.0. In order to achieve these value, the composition may neutralized with a suitable neutralization agent.

As the halophilic microorganism is capable of growing in the composition as described herein above, it is a valuable tool for the reduction of the total organic content (TOC) and thus for the treatment of sulfate rich waste waters. Depending on the strain that is used, the amount of certain organic contaminants in waste water could be reduced as well. For example, it was shown that HFX is capable of reducing degrading formate and phenol in sulfate rich composition as defined herein.

Accordingly, the composition of the present invention may further comprise at least one organic contaminant, The at least one organic contaminant shall be degraded by the cells of the halophilic microorganism, e.g. by *Haloferax*. In a preferred embodiment, the at least one organic contaminant may be a sugar, a sugar alcohol, an organic acid, a polysaccharide, a proteins or an aromatic organic compound (such as phenol or aniline). In an even more preferred embodiment, the organic contaminant is selected from formate, phenol, and aniline.

For example, the composition preferably comprises formate in an amount of at least 10 mg/l, more preferably in an amount of at least 30 mg/l, and most preferably in an amount of at least 100 mg/l (preferably, based on the total volume of the composition).

For example, the composition preferably comprises aniline in an amount of at least 0.5 mg/l, more preferably in an amount of at least 2 mg/l, and most preferably in an amount of at least 5 mg/l (preferably, based on the total volume of the composition).

For example, the composition preferably comprises phenol in an amount of at least 1 mg/l, more preferably in an amount of at least 5 mg/l, and most preferably in an amount of at least 10 mg/l (preferably, based on the total volume of the composition).

The total organic carbon content ("TOC") of the composition of the present invention is preferably a TOC of at least 50 mg/l, more preferably a TOC of at least 75 mg/l, and most preferably a TOC of at least 100 mg/l. TOC can be measured by methods well known in the art. In an embodiment, the TOC value is determined by high temperature catalytic oxidation. The organic carbon in the sample is oxidized by using a platin catalyst. The generated carbon dioxide gas is measured by a Nondispersive Infrared (NDIR) detector.

The total organic carbon content in accordance with the present invention does not encompass the cells of the halophilic microorganism. The measurement of the TOC may thus require the separation of the cells from the composition. E.g., the TOC may be measured in clear filtrate of the composition obtained after filtration.

The composition of the present invention preferably further comprises nutrients and trace elements which allow for the growth of the cells of the halophilic microorganism in the composition. Preferably, the composition comprises at least one phosphorus source, at least one nitrogen source, at least one potassium source and at least one magnesium source as nutrients. Further, the composition may comprise iron, copper, zinc, manganese and cobalt as trace elements.

Suitable concentrations for the nutrients and trace elements can be determined by the skilled person without further ado. For example, the composition of the present invention may comprise one or more of the following:

(a) $NH_4Cl$ in a concentration from 0.5 to 3 g/l, e.g. 1.5 g/l
(b) $KH_2PO_4$ in a concentration from 0.05 to 0.5 g/l, e.g. 0.15 g/l
(c) $MgCl_2*6\ H_2O$ in a concentration from 0.5 to 3 g/l, e.g. 1.3 g/l
(d) $CaCl_2*2\ H_2O$ in a concentration from 0.1 to 2 g/l, e.g. 0.55 g/l
(e) KCl in a concentration from 0.5 to 3 g/l, e.g. 1.66 g/l (f) $MgSO_4.7H_2O$ in a concentration from 0.5 to 3 g/l, e.g. 1.15 g/l (g) $FeCl_3$ in a concentration from 0.001 to 0.1 g/l, e.g. 0.005 g/l (h) KBr in a concentration from 0.1 to 2 g/l, e.g. 0.5 g/l (i) $MnCl_2.4H_2O$ in a concentration from 0.001 to 0.1 g/l. e.g. 0.003 g/l In a preferred embodiment of the present invention, the composition further comprises a substrate. Said substrate shall allow for the growth of the cells of the halophilic microorganism. Whether a compound allows for the growth of the microorganism, or not, can be assessed by the skilled person without further ado. Preferably, said substrate is a carbohydrate, more preferably said substrate is glycerol, an organic acid, or a sugar, more preferably the substrate is selected from glycerol, acetate, glucose, sucrose, lactate, malate, succinate, and citrate. In a particular preferred embodiment, the substrate is glycerol.

In an embodiment of the composition of the present invention, the composition comprises 0.5 g/l to 10 g/l, in particular 0.5 g/l to 5 g/l of the above substrate such a glycerol.

The nutrients, the trace elements and, optionally, the substrate shall allow for the growth of the halophilic microorganism as specified elsewhere herein. Accordingly, the composition of the present invention shall comprise sufficient amounts of the nutrients, trace elements and, optionally, the substrate, i.e. amounts which shall allow for the growth.

The composition of the present invention is preferably comprised by a bioreactor. Accordingly, the present invention also pertains to a bioreactor comprising the composition of the present invention. The term "bioreactor" is well-known in the art and preferably refers to a system in which conditions are closely controlled to permit the reduction of the content of the at least one pollutant as referred to herein. In an embodiment, said bioreactor is a stirred tank reactor. In a further embodiment, the bioreactor is airlift reactor. In an even further embodiment, the bioreactor is a bubble column reactor. Preferably, the bioreactor is made of a non-corrosive material such as stainless steel, Borosilicate glass, or plastic (e.g. polysulfone (PSU), polyetheretherketone (PEEK), polytetrafluoroethylene (PTFE) or polyvinylidene fluoride (PVDF)).

The definitions given herein above preferably apply mutatis mutandis to the following.

Accordingly, the present invention further pertains to a method for treating a waste water comprising alkali sulfate, comprising (a) obtaining or providing a waste water comprising alkali sulfate, (b) contacting said waste water with cells of at least one strain of a halophilic microorganism, and thereby generating an aqueous composition of the present invention, and (c) incubating said aqueous composition under conditions which allow for the treatment of the waste water.

In a preferred embodiment, the method further comprises step (d) of subjecting the treated (incubated) aqueous composition, i.e. the waste water obtained after carrying step (c), to electrolysis.

If the alkali sulfate is sodium sulfate, NaOH, sulfuric acid, oxygen and hydrogen can be produced by said electrolysis.

Accordingly, the present invention further pertains to a method for producing NaOH, sulfuric acid, oxygen and hydrogen, comprising (a) obtaining or providing a waste water comprising sodium sulfate, (b) contacting said waste water with cells of at least one strain of a halophilic microorganism, and thereby generating an aqueous composition of the present invention, and (c) incubating said aqueous composition under conditions which allow for the treatment of the waste water, and (d) subjecting the incubated aqueous composition to electrolysis, thereby producing and NaOH, sulfuric acid, oxygen and hydrogen.

Before subjecting the treated waste water to electrolysis, the cells may be separated from the treated waste water to obtain a filtrate of treated waste water. Accordingly, step d) may comprise separating the cells from the treated waste water to obtain a filtrate of treated waste water, and subjecting the obtained filtrate of treated waste water to electrolysis.

The term "treatment of waste water" preferably refers to the reduction of the total organic carbon content of the waste water and/or to the reduction of the specific organic contaminants, in particular formate, aniline and phenol. If step d) is carried out, the term preferably further comprises the reduction of the alkali sulfate content, e.g. sodium sulfate content of the waste water. The term "reducing" as used herein shall refer to a significant reduction (of the TOC content, the content of the specific organic contaminant and/or the content of sodium sulfate). Preferably, the term denotes a reduction of at least 30%, at least 50%, at least 70% or in particular of at least 90% or of at least 95% of the TOC content, the content of the specific organic contaminant, and/or the content of sodium sulfate present in the composition generated in step b). Accordingly, the content shall be reduced by at least 30%, at least 50%, at least 70% or in particular by at least 90% or by at least 95%.

The two-step process presented here enables in particular the recycling of sodium sulfate rich waste waters. While steps a) to c) of the process have the goal to remove organic impurities from the waste water, step d) regains sulfuric acid and sodium hydroxide from the waste water. Without the prior biologic treatment, organic components from the industrial waste water would cause membrane fouling very quickly. As a result, power consumption would increase distinctly and migration of sodium ions would be impeded. A high frequent purging of the system would be necessary. Accordingly, an efficient recycling of sulfate rich waste water can be achieved.

In step b) of the aforementioned methods, the waste water is contacted with cells of the at least one strain of a halophilic microorganism. Preferably, the cells are contacted with the waste water by mixing the cells with the waste water (e.g. in a bioreactor).

By contacting the waste water with the cells, the composition of the present invention as defined above is generated. Depending on the composition of the waste water, step b) may further comprise the adding of further components to the composition. In a preferred embodiment, a substrate, nutrients and/or trace elements are added to the composition.

After contacting the waste water with the cells (and optionally after adding sufficient amounts of a substrate, nutrients and/or trace elements to the composition), the resulting composition is incubated in order to allow for the treatment of the waste water, i.e. for the reduction of the TOC content and/or the content of the specific organic contaminant such as formate and phenol. The incubation of the composition shall be carried out under suitable conditions, i.e. under conditions which allow for the reduction of the TOC content and/or the content of the specific organic contaminant by the cells of said halophilic microorganism as referred to herein. Preferably, the incubation is carried out in a bioreactor.

The term "incubating said aqueous composition under conditions which allow for the treatment of the waste water" is well understood by the skilled person. The treatment of the waste water as set forth in step c) of the method of the present invention is achieved by the activity of the cells of at least one strain of a halophilic microorganism. As will be understood by the skilled person, such cells require certain conditions to be active. E.g., the pH value or the temperature has to be within a certain range. Further, the presence of oxygen might be required. Moreover, nutrients might have to be present. The established of suitable conditions can be carried out by the skilled person without further ado. Further, it is routine to assess whether cells are active, or not.

Preferred pH values and temperatures are given herein below.

Preferably, the incubation in step c) is carried out at a temperature of 18° C. to 55° C., more preferably at a temperature of 25° C. to 45° C., even more preferably at a temperature of 30° C. to 40° C., most 35 preferably at a temperature of 35° C. to 40° C. The optimal temperature is 37° C.

Preferably, the incubation in step c) is carried out at a pH value in the range of 4.0 to 9.0, more preferably in the range of 6.0 to 8.2, even more preferably in the range of 6.2 to 7.6, most preferably in the range of 6.8 to 7.4. The optimal pH value is 7.2.

Depending on the pH value of the waste water to be treated, the waste water may be neutralized. Accordingly, the method of the present invention may further comprise a step processing the waste water to a pH value as indicated above, e.g. a pH value in the range of 4.0 to 9.0. This step is preferably carried before contacting the cells with the water. In an embodiment, the waste water is processed to a pH value as specified herein by adding a neutralizing agent to the waste water.

Further, the process shall be carried out under aerobic conditions. Preferably, aerobic conditions are maintained by introducing air or purified oxygen to the bioreactor.

After carrying out the incubation step c), the obtained waste water (i.e. the treated waste water) can either be disposed or subjected to further steps.

In an embodiment of the method of the present invention, the cells are separated from the treated waste water to obtain a filtrate of treated waste water. The separation of cells from the waste water can be achieved by methods well-known in the art. In an embodiment, the cells are separated from the waste water by centrifugation. In a further embodiment, the cells are separated from the waste water by decanting. In an even further embodiment, the cells are separated from the waste water by sedimentation. In a particularly preferred embodiment, the cells are separated from the treated waste water by filtration. Preferably, the filtration is membrane filtration.

In a preferred embodiment of the present invention, the method further comprises the step of concentrating the obtained filtrate of treated waste water. This step will increase the alkali sulfate concentration, e.g. the sodium sulfate concentration of the treated waste water, i.e. sodium sulfate is up-concentrated in the treated waste water.

The separation step and the concentration steps are preferably carried out before subjecting the treated waste water to electrolysis.

Further, the treated waste water obtained in step c) of the method of the present invention, the obtained filtrate of treated waste water, or the concentrated filtrate can be subjected to further purification steps. In an embodiment of the method of the present invention, the method further comprises the removal of inorganic components. Said inorganic components are preferably trace elements and/or salts of the media components. The further purification steps shall be carried our prior to subjecting the treated waste water obtained in step c), the obtained filtrate of treated waste water, or the concentrated filtrate to alkali sulfate electrolysis, e.g. sodium sulfate electrolysis.

How to carry out alkali sulfate electrolysis is well known in the art (see e.g.: ULLMANN'S Encyclopedia of Industrial Chemistry, 2012, Vol. 33, Wiley-VCH Verlag GmbH & Co. KGaA, Weinheim, p. 383-397; DOI: 10.1002/14356007.a24_355. The electrolysis of sodium sulfate takes place according to the overall reaction:

$$2Na_2SO_4 + 6H_2O \rightarrow H_2SO_4 + 4NaOH + 2H_2 + O_2$$

In an embodiment, the electrolysis cell is divided in two compartments, separated by an ion-exchange membrane. At the anode, water is oxidized to protons and oxygen. The sodium ions migrate under the action of the electric field through the ion-exchange membrane into the cathode space. On the cathode side water is electrochemically reduced to hydroxide ions and hydrogen. As a result sulfuric acid and oxygen are formed in the anode space and hydrogen is formed along with sodium hydroxide in the cathode space.

In another embodiment, the electrolysis cell is divided in three compartments. In that case, the filtrate or concentrate of the filtrate is fed to a compartment that is on one side connected to the anode space via an anion exchange membrane and on the other side connected to the cathode space via a cation exchange membrane. As a result products can be extracted in higher purity and to higher concentrations.

In another embodiment, the cathode is an oxygen depolarized cathode. In this case the electrolysis of sodium sulfat takes place according to the overall reaction:

$$2Na_2SO_4 + 4H_2O \rightarrow H_2SO_4 + 4NaOH$$

All references cited in this specification are herewith incorporated by reference with respect to their entire disclosure content and the disclosure content specifically mentioned in this specification.

The invention will be merely illustrated by the following Examples. The said Examples shall, whatsoever, not be construed in a manner limiting the scope of the invention.

EXEMPLARY EMBODIMENTS

Example 1: Toleration of Sodium Sulfate in Combination with Sodium Chloride

*Haloferax mediterranei* (DSM 1411) is an extreme halophilic archaeon which requires a minimum of 140 g/L NaCl for growth. Optimal growth is reported for concentrations of 170 g/L NaCl. The experiments described in this example should answer the following questions:
1) Can HFX tolerate high concentrations of sodium sulfate?
2) Can HFX degrade organic components when sodium chloride in the medium is partly replaced by sodium sulfate?
3) Can HFX degrade the components glycerol, phenol and formate in sulfate rich waste water?

For part 1) of the experiment HFX was cultivated in medium containing 150 g/L sodium chloride and sodium sulfate in concentrations of 0 to 100 g/L. In part 2) the sodium chloride in the medium was replaced by sodium sulfate. Because $Na_2SO_4$ contains two sodium molecules, each mol of NaCl was replaced by 0.5 mol $Na_2SO_4$. In part 1) and 2) glycerol is used as substrate. A successful TOC reduction is shown, when glycerol concentration is decreased by the cell's metabolism. In part 3) the components phenol and formate were added to the shake flasks as pulses. HPLC analysis should show the degradation of the components over a period of 6 days.

The basal medium for all experiments contained the following components: KCl 1.66 g/L, $NH_4Cl$ 1.5 g/L, $KH_2PO_4$ 0.15 g/L, $MgCl_2.6H_2O$ 1.3 g/L, $MgSO_4.7H_2O$ 1.1 g/L, $FeCl_3$ 0.005 g/L, $CaCl_2.2H_2O$ 0.55 g/L, KBr 0.5 g/L, Mn stock 3 ml and trace elements 1 ml. The pH was adjusted to 7.0. Trace elements containing Fe, Cu, Mn, Co, Zn. Sodium chloride and sodium sulfate were added to the medium according to the description of the experiment. The 500 mL flasks were filled with a volume of 150 mL and sterilized prior to cultivation. Shake-flasks were inoculated with 30 mL preculture that did not contain any complex carbon or nitrogen source or sodium sulfate. The inoculum was free of any residual carbon source. Cells were grown in laboratory incubator (Infors, Switzerland) with 180 rpm and 37° C. Experiments 1 and 2 were done in triplicates together with a control experiment with only medium and no cells.

Can HFX Tolerate High Concentrations of Sodium Sulfate?

Figure 1:
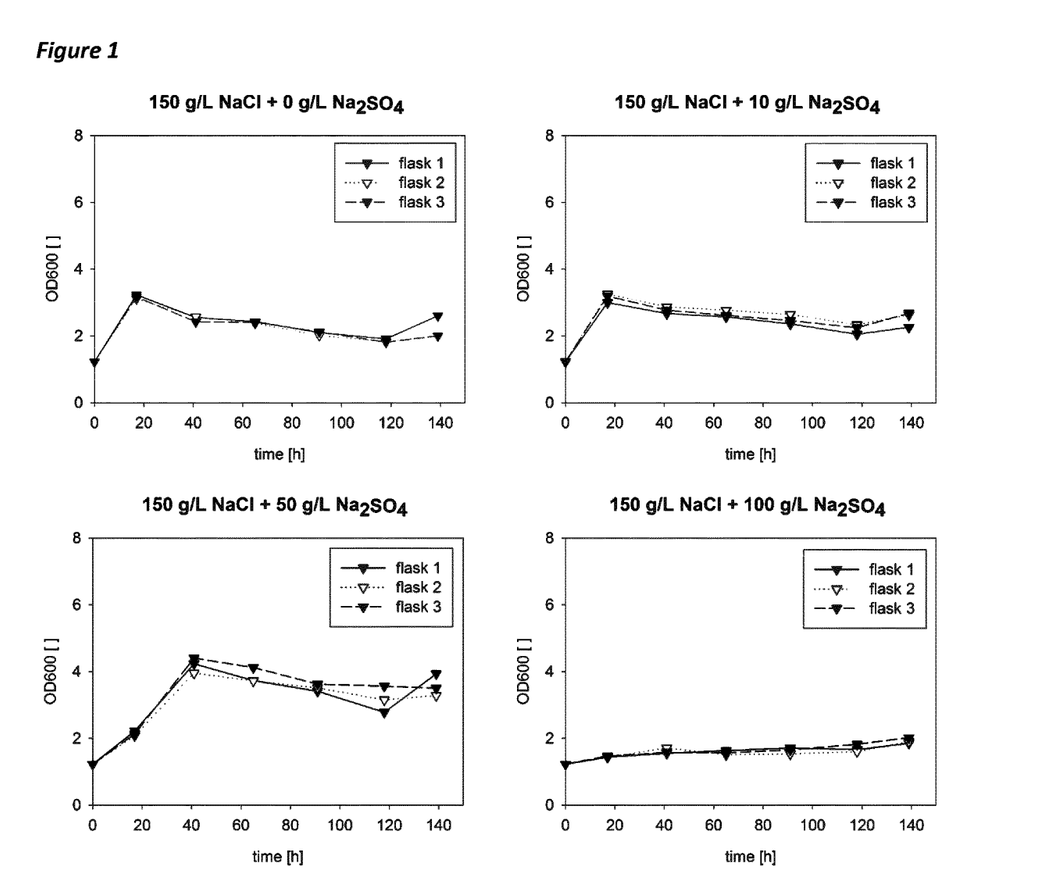
FIG. 1. Growth of HFX on Medium with 150 g/L NaCl and x % $Na_2SO_4$. Optical Density (OD) at 600 nm as a measure for the biomass concentration. The experiments were performed in triplicates (flask 1-3). Formation of biomass could be observed for all cases. Addition of sulfate had a positive influence on biomass growth up to 50 g/L $Na_2SO_4$. Reproducibility was high.
Figure 3:
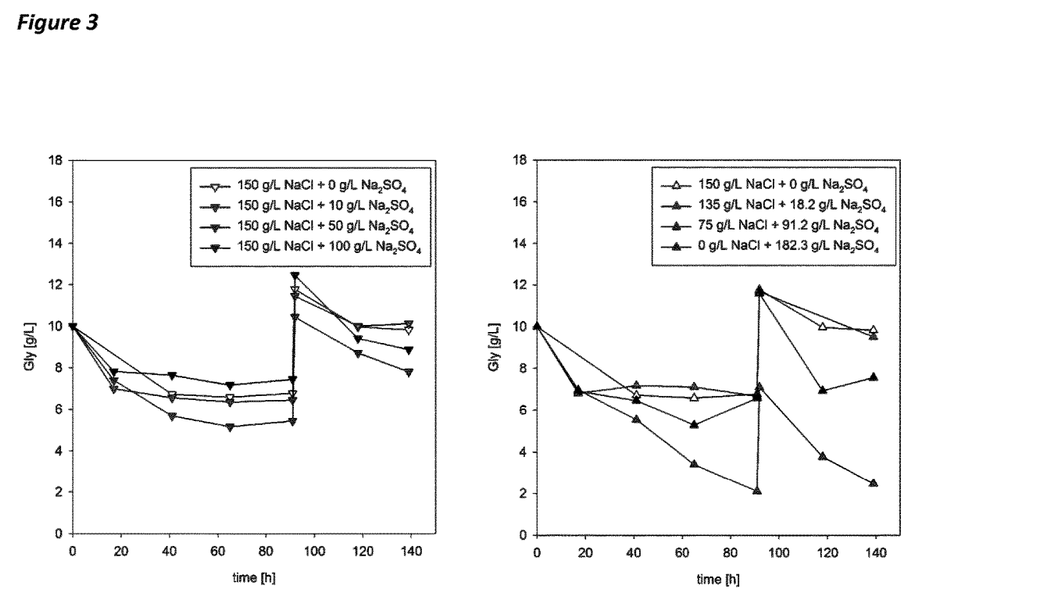
FIG. 3. Glycerol concentration in dependence of salt concentration in the medium. Addition of 5 g/L glycerol at 92 h culture time. Highest degradation of glycerol not in reference (150 g/L NaCl+0 g/L $Na_2SO_4$), but in shake flask containing sodium sulfate.

Results show that HFX can grow on the substrate glycerol at sodium sulfate concentrations of 0 to 100 g/L (see FIG. 1). Surprisingly the OD, as measure for the biomass concentration, is highest for the experiment with 150 g/L NaCl and 50 g/L $Na_2SO_4$. This indicates that growth of the organism is promoted by addition of sulfate. The results are supported by the measurement of glycerol in the medium (see FIG. 3). The results of the triplicates showed high reproducibility for this experiment part 1.

Can HFX Degrade Organic Components when Sodium Chloride in the Medium is Partly Replaced by Sodium Sulfate?

Figure 2:
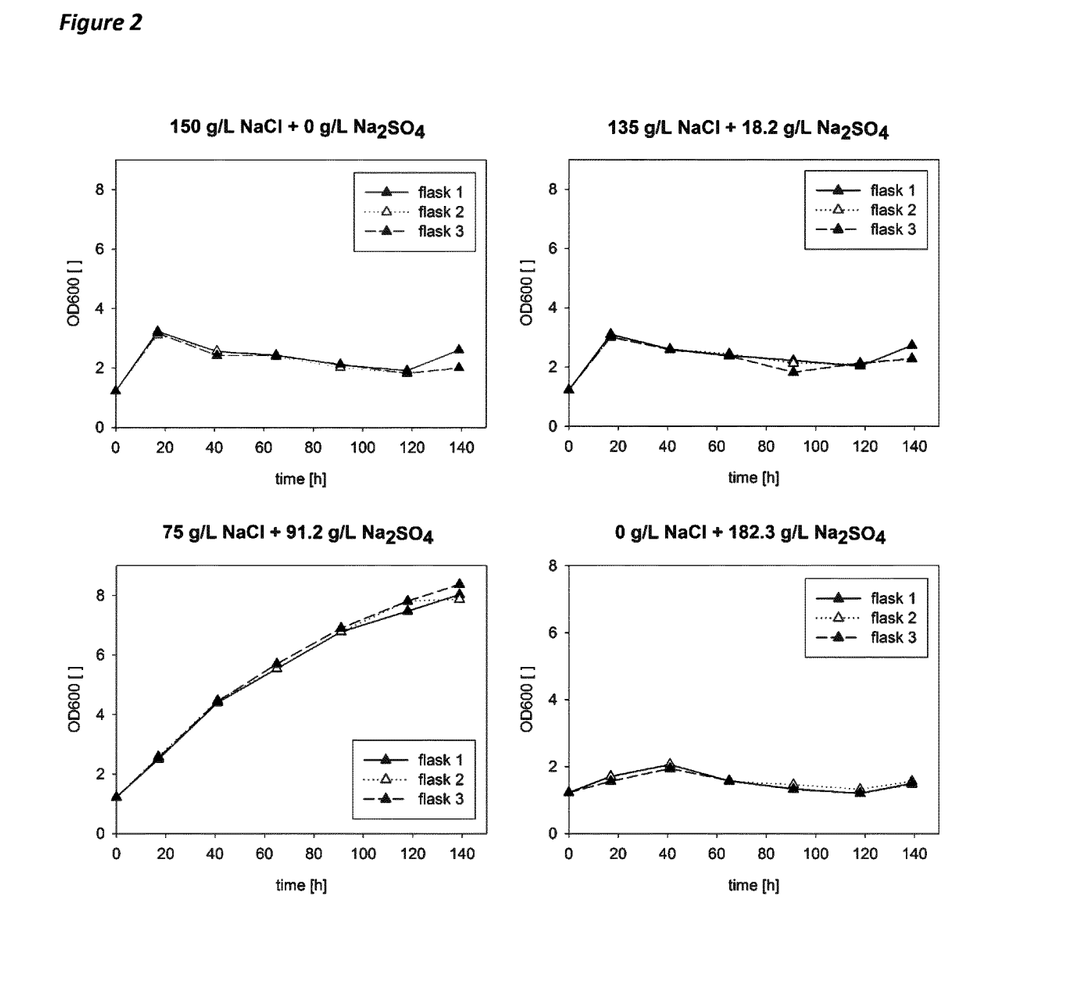
FIG. 2: Growth of HFX on Medium with NaCl partially supplemented by $Na_2SO_4$. Optical Density (OD) at 600 nm as a measure for the biomass concentration. The experiments were performed in triplicates (flask 1-3). Formation of biomass could be observed for all cases. Addition of sulfate had a positive influence on biomass growth up to 75 g/L NaCl+91.2 g/L $Na_2SO_4$. Reproducibility was high.

Results show that HFX can grow in medium where sodium chloride is replaced by sodium sulfate up to 100% (see FIG. 2). Surprisingly the OD, as measure for the biomass concentration, is highest for the experiment with 75 g/L NaCl and 91.2 g/L $Na_2SO_4$ and therefore higher than the reference with 150 g/L NaCl. This indicates that growth of the organism is promoted by addition of sulfate. The results are supported by the measurement of glycerol in the medium (see FIG. 3). The results of the triplicates showed high reproducibility for experiment part 2.

Results from the glycerol measurements surprisingly show that HFX can degrade organic components in medium that contained sodium sulfate but no sodium chloride.

Can HFX Degrade the Components Glycerol Phenol and Formate in Sulfate Rich Waste Water?

Figure 4:
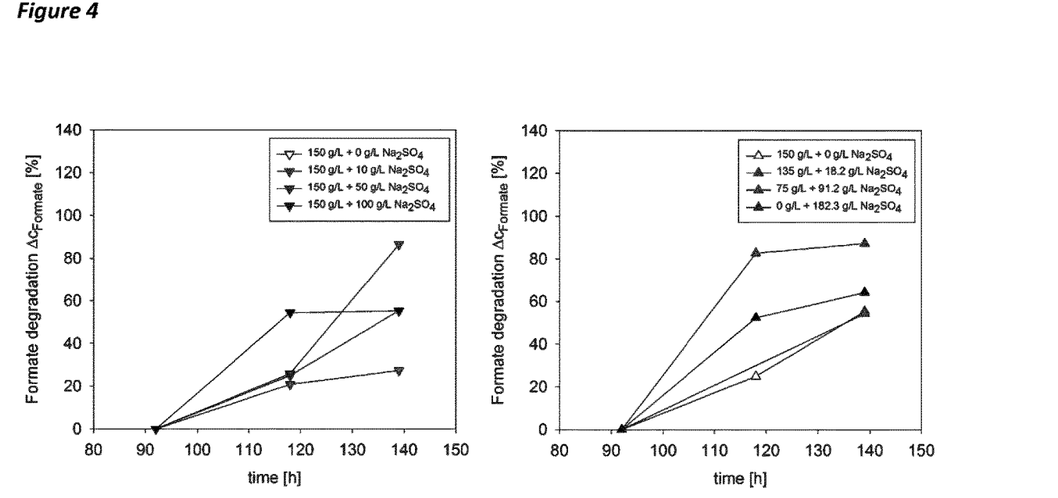
FIG. 4. Formate reduction in dependence of salt concentration in the medium. Difference in concentration was referred to the start value. Decrease of formate concentration could be measured in all shake flasks.
Figure 5:
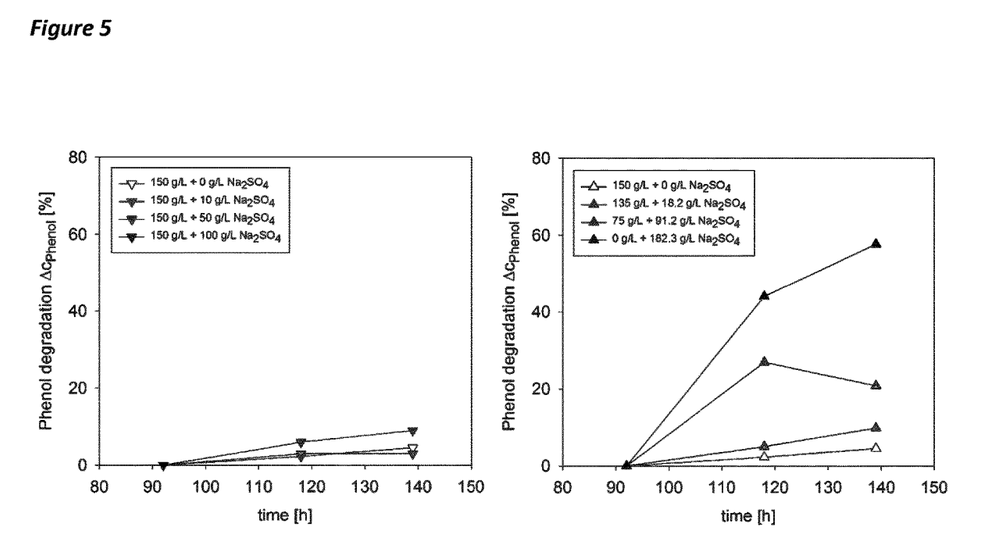
FIG. 5. Phenol reduction in dependence of salt concentration in the medium. Difference in concentrations was referred to the start value. Decrease of phenol concentration was repressed by NaCl. The lower the NaCl concentration was the higher was the phenol degradation.

Degradation of glycerol was shown in experiment part 1) and 2). For the degradation of phenol and formate, those substances were added to the shake flasks as a pulse after 92 h of inoculation. Earlier studies showed that the removal of phenol and formate was more effective when a second substrate had been added. For this reason the pulse were 5 g/L glycerol+0.1 g/L phenol or 5 g/L glycerol+1.5 g/L sodium formate. Results from experiment part 3) showed that both formate and phenol could be degraded in sulfate rich waste water by HFX (see FIGS. 4 and 5). The extreme halophilic archaeon thereby showed simultaneous degradation of glycerol and formate or glycerol and phenol. Surprisingly it could be observed that degradation of phenol is suppressed by NaCl. While phenol concentration could be reduced only little in medium containing 150 g/L NaCl+x g/L $Na_2SO_4$, the phenol was degraded significantly when NaCl was replaced by $Na_2SO_4$. Highest degradation of phenol surprisingly showed for medium with 182.3 g/L $Na_2SO_4$ and no NaCl (see FIG. 5).

Example 2: Variation of Sodium Sulfate Concentration in the Medium

1) Can *Haloferax mediterranei* tolerate high concentrations of 50-400 g/L sodium sulfate without any NaCl?
2) Can HFX degrade organic components (e.g. glycerol, phenol) in sodium sulfate rich medium without any NaCl?

For part 1) of the experiment, instead of sodium chloride different concentrations of sodium sulfate were added to the synthetic HFX medium. Due to the maximum solubility of 480 g/L at 37° C., sodium sulfate was added in concentrations of 50-400 g/L. Glycerol was used as carbon source in a concentration of 2 g/L. A successful TOC reduction is shown, when the glycerol concentration is decreased by the cell's metabolism during 5 days of cultivation.

When the glycerol was fully degraded at 96 hours, one shake flask of every double determination was pulsed with 0.1 g/L phenol and 2 g/L glycerol as second substrate. The second shake flask was pulsed with 2 g/L glycerol. The HPLC analysis should show the degradation of the components over a period of 2 days. In both parts the pH in the shake flasks was adjusted every 24 hours using 1 M NaOH.

The basal medium for all experiments contained the following components: KCl 1.66 g/L, $NH_4Cl$ 1.5 g/L, $KH_2PO_4$ 0.15 g/L, $MgCl_2.6H_2O$ 1.3 g/L, $MgSO_4.7H_2O$ 1.1 g/L, $FeCl_3$ 0.005 g/L, $CaCl_2.2H_2O$ 0.55 g/L KBr 0.5 g/L, Mn stock 3 ml and trace elements 1 ml. The pH was adjusted to 7.0. Trace elements containing Fe, Cu, Mn, Co, Zn. Sodium chloride and sodium sulfate were added to the medium according to the description of the experiment. The 500 mL flasks were filled with a volume of 150 mL and sterilized prior to cultivation. Each shake-flask was inoculated with 4.5 ml preculture with an OD of 17, resulting in an initial OD of 0.5. The preculture did not contain any complex carbon or nitrogen source. The preculture contained 91 g/L sodium sulfate and 75 g/L sodium chloride, resulting in an additional sodium sulfate and sodium chloride concentration of 0.34 and 0.28 g/L in the shake flasks. The inoculum was free of any residual carbon source. Cells were grown in laboratory incubator (Infors, Switzerland) with 180 rpm and 37° C. Experiments 1 and 2 were done in double determination together with a reference experiment with 170 g/L sodium chloride medium and a control experiment with 150 g/L sodium sulfate medium without cells.

Can *Haloferax mediterrnei* (HFX) tolerate high concentrations of 50-400 g/L sodium sulfate without any NaCl?

Figure 6:
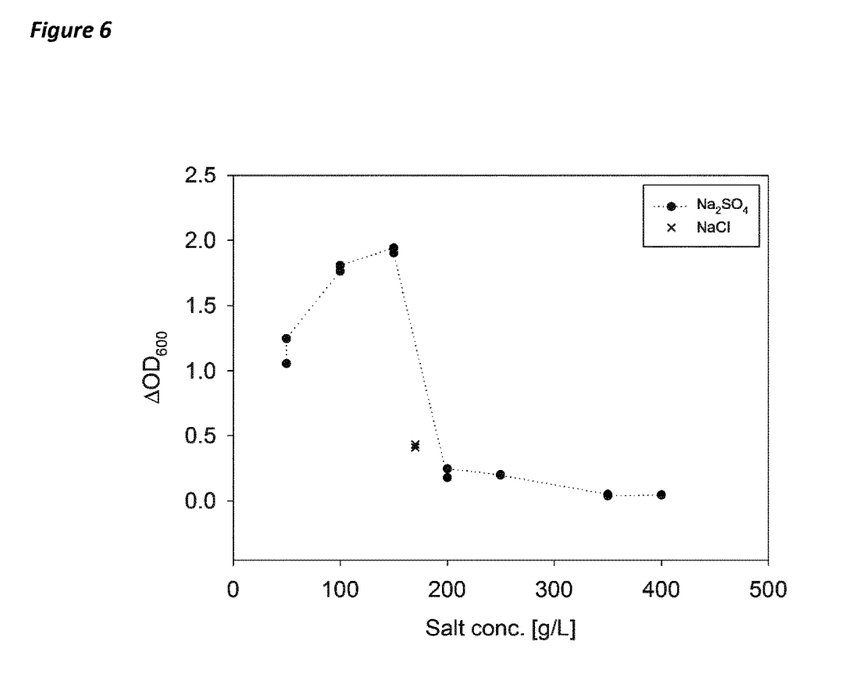
FIG. 6. Optical density difference between start (0 hours) and end of cultivation (95.5 hours) at 50-400 g/L $Na_2SO_4$ or 170 g/L NaCl (Reference). Optical Density (OD) at 600 nm is used as measure for the biomass concentration. $\Delta OD_{600}$ was referred to start concentration to obtain relative values in %. The experiments were performed in double determination. Sodium sulfate had a positive influence on biomass growth between 50-250 g/L $Na_2SO_4$. Reproducibility was high.

The results show, that HFX can grow on the substrate glycerol at sodium sulfate concentrations of 50-250 g/L without any sodium chloride (see FIG. 6). The results are supported by the measurement of glycerol in the medium (see FIG. 7). Surprisingly HFX grew even better in medium with 50-150 g/L $Na_2SO_4$, than in the reference with 170 g/L NaCl. As in the previous experiment, this indicates again, that growth of the organism is promoted by addition of sulfate.

Can HFX Degrade Organic Components (e.g. Glycerol, Phenol) in Sodium Sulfate Rich Medium without any NaCl?

Figure 7:
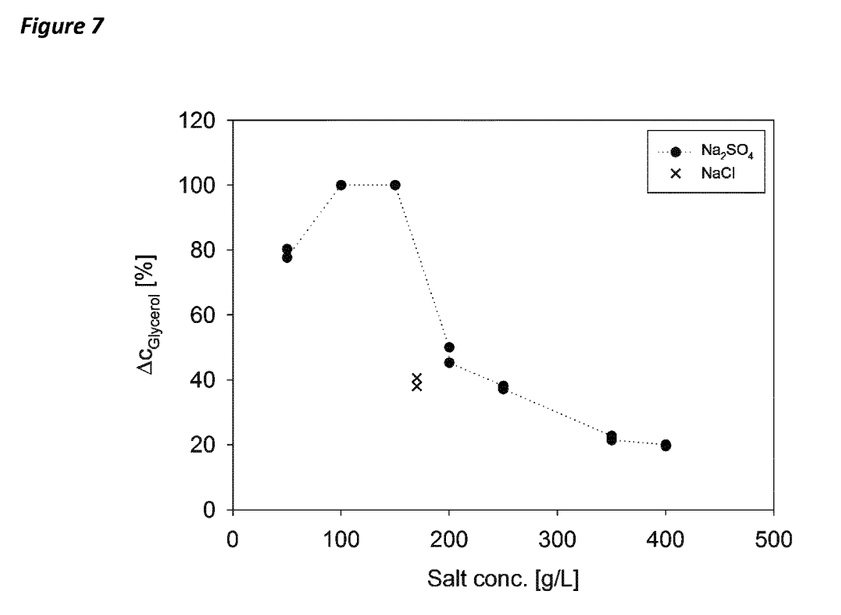
FIG. 7. Glycerol degradation between 0 and 95.5 hours in dependence of salt concentration. $\Delta c$ was referred to start concentration to obtain relative degradation in %. The experiments were performed in double determination. Highest degradation of glycerol in shake flask containing 100-150 g/L sodium sulfate.

Degradation of glycerol was shown in experiment part 1). 100% glycerol degradation was found for 100 and 150 g/L $Na_2SO_4$ (see FIG. 7).

Figure 8:
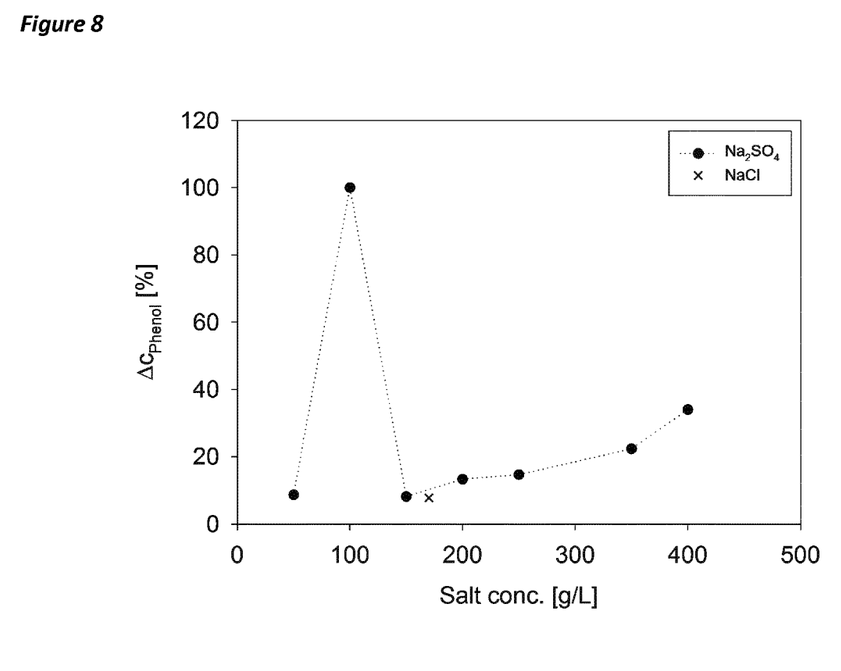
FIG. 8. Phenol degradation in between 98.5 and 146 hours in dependence of salt concentration. $\Delta c$ was referred to start concentration to obtain relative degradation in %. Highest degradation of phenol was found in shake flask containing 100 g/L sodium sulfate.

Surprisingly it could be observed that the phenol concentration could be reduced only a little in medium containing 170 g/L NaCl, while phenol was fully degraded when NaCl was replaced by 100 g/L $Na_2SO_4$ (see figure). The results indicate that phenol degradation is suppressed when NaCl is contained in the medium.

CITED LITERATURE

Amoozegar, M. A., Malekzadeh, F., Malik, K. A., 2003. Production of amylase by newly isolated moderate halophile, *Halobacillus* sp. strain MA-2. Journal of Microbiological Methods 52, 353-359. doi:10.1016/50167-7012(02)00191-4

Amoozegar, M. A., Salehghamari, E., Khajeh, K., Kabiri, M., Naddaf, S., 2008. Production of an extracellular thermohalophilic lipase from a moderately halophilic bacterium, *Salinivibrio* sp. strain SA-2. J. Basic Microbiol. 48, 160-167. doi:10.1002/jobm.200700361

DasSarma, S., Arora, P., 2001. Halophiles, in: ELS. John Wiley & Sons, Ltd. doi:10.1038/npg.els.0000394

Horneck, G., Baumstark-Khan, C., 2012. Astrobiology: The Quest for the Conditions of Life. Springer Science & Business Media.

Karbalaei-Heidari, H. R., Amoozegar, M. A., Hajighasemi, M., Ziaee, A.-A., Ventosa, A., 2009. Production, optimization and purification of a novel extracellular protease from the moderately halophilic bacterium *Halobacillus karajensis*. J Ind Microbiol Biotechnol 36, 21-27. doi: 10.1007/s10295-008-0466-y Lens, P. N. L., Visser, A., Janssen, A. J. H., Pol, L. W. H., Lettinga, G., 1998. Biotechnological Treatment of Sulfate-Rich Wastewaters. Critical Reviews in Environmental Science and Technology 28, 41-88. doi: 10.1080110643389891254160

Oren, A., Hallsworth, J. E., 2014. Microbial weeds in hypersaline habitats: the enigma of the weedlike *Haloferax mediterranei*. FEMS Microbiology Letters 359, 134-142. doi:10.1111/1574-6968.12571

Roeßler, M., Müller, V., 2001. Osmoadaptation in bacteria and archaea: common principles and differences. Environmental Microbiology 3, 743-754. doi:10.1046/j.1462-2920.2001.00252.x Roeßler, M., Sewald, X., Müller, V., 2003. Chloride dependence of growth in bacteria. FEMS Microbiol Lett 225, 161-165. doi:10.1016/S0378-1097(03)00509-3

Saritpongteeraka, K., Chaiprapat, S., 2008. Effects of pH adjustment by parawood ash and effluent recycle ratio on the performance of anaerobic baffled reactors treating high sulfate wastewater. Bioresource Technology 99, 8987-8994. doi:10.1016/j.biortech.2008.05.012

Schmidt, V. M., 2003. Elektrochemische Verfahrenstechnik. Wiley-VCH.

Vallero, M. V. G., Lettinga, G., Lens, P. N. L., 2005. High rate sulfate reduction in a submerged anaerobic membrane bioreactor (SAMBaR) at high salinity. Journal of Membrane Science 253, 217-232.

Yamaguchi, T., Harada, H., Hisano, T., Yamazaki, S., Tseng, I.-C., 1999. Process behavior of UASB reactor treating a wastewater containing high strength sulfate. Water Research 33, 3182-3190.doi:10.1016/S0043-1354(99)00029-9

The invention claimed is:

1. An aqueous composition comprising
   (a) cells of at least one strain of a halophilic archaeon, and
   (b) alkali sulfate
   wherein the aqueous composition comprises less than 50 g/l sodium chloride and the concentration of alkali sulfate in the aqueous composition is at least 30 g/l based on the total volume of the of the aqueous composition.

2. The aqueous composition of claim 1, wherein said aqueous composition comprises alkali sulfate in a concentration of at least 50 g/l, based on the total volume of the aqueous composition.

3. The aqueous composition of claim 1, wherein said alkali sulfate is sodium sulfate ($Na_2SO_4$), lithium sulfate ($LiSO_4$), or potassium sulfate ($K_2SO_4$).

4. The aqueous composition of claim 1, wherein the halophilic archaeon belongs to the family of the Halobacteriaceae.

5. The method of claim 1, wherein the halophilic archaeon is *Haloferax mediterranei*.

6. The aqueous composition of claim 1, wherein the aqueous composition further comprises at least one organic compound as an organic contaminant.

7. The aqueous composition of claim 1, wherein the composition has a total organic carbon content (TOC) of at least 50 mg/l.

8. The aqueous composition of claim 6, wherein the organic contaminant is selected from formate, phenol, and aniline.

9. The aqueous composition of claim 1, wherein the halophilic archaeon is growing in the aqueous composition.

10. The aqueous composition of claim 1, wherein the aqueous composition is a waste water comprising organic compounds resulting from chemical or biological production processes.

11. A bioreactor comprising the aqueous composition of claim 1.

12. A method for treating a waste water comprising alkali sulfate, comprising
  (a) obtaining or providing a waste water comprising alkali sulfate, having a concentration of alkali sulfate in the aqueous composition is at least 30 g/l based on the total volume of the of the aqueous composition,
  (b) contacting the waste water with cells of at least one strain of a halophilic archaeon microorganism, resulting in the aqueous composition according to claim 1, and
  (c) incubating said aqueous composition under conditions which that allow for the treatment of the waste water.

13. The method of claim 12, wherein the treatment of the waste water comprises the reduction of the total organic content of said waste water and/or the reduction of the amount of at least one organic contaminant comprised by said waste water.

14. The method of claim 12, further comprising the steps of separating the cells from the treated waste water to obtain a filtrate of treated waste water and subjecting the obtained filtrate of treated waste water to alkali sulfate electrolysis.

15. A method comprising providing cells of at least one strain of a halophilic archaeon and reducing an amount of total organic carbon content in a waste water and/or an amount of at least one organic contaminant in the aqueous composition according to claim 1.

* * * * *